United States Patent
Collier et al.

(10) Patent No.: US 11,759,770 B2
(45) Date of Patent: Sep. 19, 2023

(54) PASSIVE $NO_x$ ADSORBER

(71) Applicant: Johnson Matthey Public Limited Company, London (GB)

(72) Inventors: Jillian Collier, Reading (GB); Francois Moreau, Royston (GB); Matthew O'Brien, Royston (GB); Paul Richard Phillips, Royston (GB); Sanyuan Yang, Savannah, GA (US)

( * ) Notice: Subject to any disclaimer, the term of this patent is extended or adjusted under 35 U.S.C. 154(b) by 0 days.

(21) Appl. No.: 17/726,686

(22) Filed: Apr. 22, 2022

(65) Prior Publication Data

US 2022/0339613 A1   Oct. 27, 2022

Related U.S. Application Data

(60) Provisional application No. 63/201,350, filed on Apr. 26, 2021.

(51) Int. Cl.
| | | |
|---|---|---|
| *B01D 53/94* | (2006.01) | |
| *B01J 29/74* | (2006.01) | |
| *B01J 35/04* | (2006.01) | |
| *F01N 3/035* | (2006.01) | |
| *F01N 3/08* | (2006.01) | |
| *F01N 3/20* | (2006.01) | |
| *F01N 3/28* | (2006.01) | |

(52) U.S. Cl.
CPC ............ *B01J 29/74* (2013.01); *B01D 53/944* (2013.01); *B01D 53/9413* (2013.01); *B01D 53/9481* (2013.01); *B01J 35/04* (2013.01); *F01N 3/035* (2013.01); *F01N 3/0842* (2013.01); *F01N 3/2066* (2013.01); *F01N 3/2803* (2013.01); *B01D 2255/1021* (2013.01); *B01D 2255/1023* (2013.01); *B01D 2255/50* (2013.01); *B01D 2255/91* (2013.01); *B01D 2255/9155* (2013.01); *B01J 2229/18* (2013.01); *F01N 2370/04* (2013.01)

(58) Field of Classification Search
CPC .... F01N 3/0842; F01N 3/2066; F01N 3/2803; F01N 2370/04; F01N 3/0814; F01N 2240/18; F01N 2250/12; F01N 2570/14; F01N 3/035; B01J 29/74; B01J 35/04; B01J 2229/18; B01D 53/9413; B01D 53/944; B01D 53/9481; B01D 2255/1021; B01D 2255/1023; B01D 2255/50; B01D 2255/91; B01D 2255/9155
See application file for complete search history.

(56) References Cited

U.S. PATENT DOCUMENTS

| | | | |
|---|---|---|---|
| 4,300,956 A | 11/1981 | Rosenberger et al. | |
| 5,146,743 A | 9/1992 | Maus et al. | |
| 6,513,324 B2 | 2/2003 | Bruck et al. | |
| 10,112,184 B2 | 10/2018 | Yang | |
| 2015/0158019 A1* | 6/2015 | Rajaram | B01J 29/85 422/171 |
| 2015/0273452 A1* | 10/2015 | Chiffey | B01J 37/0244 502/66 |
| 2017/0096923 A1* | 4/2017 | Chiffey | B01J 35/04 |

FOREIGN PATENT DOCUMENTS

| | | | | |
|---|---|---|---|---|
| WO | 9947260 A1 | 9/1999 | | |
| WO | 2007077462 A1 | 7/2007 | | |
| WO | 2011080525 A1 | 7/2011 | | |
| WO | 2015085300 A1 | 6/2015 | | |
| WO | 2015085303 | 6/2015 | | |
| WO | WO 2015 085 303 A1 * | 6/2015 | ............ B01D 53/94 |
| WO | 2019077111 A1 | 4/2019 | | |
| WO | 2019186163 A1 | 10/2019 | | |
| WO | 2019/229675 A1 | 12/2019 | | |
| WO | 2020/227455 A1 | 11/2020 | | |
| WO | WO 2021 080 894 A1 * | 4/2021 | ......... B01D 53/9422 |

* cited by examiner

*Primary Examiner* — Timothy C Vanoy

(57) ABSTRACT

A passive NOx absorber for treating an exhaust gas from a diesel engine is described. The passive NOx absorber comprises a first washcoat region comprising a zeolite catalyst, the zeolite catalyst comprising a noble metal and a zeolite having a SAR of 2-15.

19 Claims, No Drawings

PASSIVE NO$_x$ ADSORBER

FIELD OF THE INVENTION

The invention relates to a passive NO$_x$ adsorber for a lean burn engine and to an exhaust system for a lean burn engine comprising the passive NO$_x$ adsorber catalyst. The invention also relates to a method of using the NO$_x$ absorber catalyst to treat an exhaust gas from a lean burn engine.

BACKGROUND OF THE INVENTION

Lean burn engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen (NO$_x$) and particulate matter (PM).

A variety of emissions control devices exist for the treatment of oxides of nitrogen (NO$_x$). These devices include, for example, a selective catalytic reduction (SCR) catalyst, a selective catalytic reduction filter (SCRF™) catalyst, a lean NO$_x$ catalyst [e.g. hydrocarbon (HC) SCR catalyst], a lean NO$_x$ trap (LNT) [also known as a NO$_x$ storage catalyst (NSC) or a NO$_x$ adsorber catalyst (NAC)] and a passive NO$_x$ adsorber (PNA).

SCR catalysts or SCRF™ catalysts typically achieve high efficiencies for treating NO$_x$ by reduction once they have reached their effective operating temperature. However, these catalysts or devices can be relatively inefficient below their effective operating temperature, such as when the engine has been started from cold (the "cold start" period) or has been idling for a prolonged period.

Another common type of emissions control device for reducing or preventing the emission of NO$_x$ is a lean NO$_x$ trap (LNT). During normal operation, a lean burn engine produces an exhaust emission having a "lean" composition. An LNT is able to store or trap the nitrogen oxides (NO$_x$) that are present in the "lean" exhaust emission. The LNT stores or traps the NO$_x$ present in the exhaust emission by a chemical reaction between the NO$_x$ and a NO$_x$ storage component of the LNT to form an inorganic nitrate. The amount of NO$_x$ that can be stored by the LNT is limited by the amount of NO$_x$ storage component that is present. Eventually, it will be necessary to release the stored NO$_x$ from the NO$_x$ storage component of the LNT, ideally when a downstream SCR or SCRF™ catalyst has reached its effective operating temperature. Release of stored NO$_x$ from an LNT is typically achieved by running the lean burn engine under rich conditions to produce an exhaust emission having a "rich" composition. Under these conditions, the inorganic nitrates of the NO$_x$ storage component decompose to reform NO$_x$. This requirement to purge an LNT under rich conditions is a disadvantage of this type of emissions control device because it affects the fuel economy of the vehicle and it increases the amount of carbon dioxide (CO$_2$) by combustion of additional fuel. LNTs also tend to show poor NO$_x$ storage efficiency at low temperatures.

A relatively new type of emissions control device for NO$_x$ is a passive NO$_x$ adsorber (PNA). PNAs are able to store or adsorb NO$_x$ at relatively low exhaust gas temperatures (e.g. less than 200° C.), usually by adsorption, and release NO$_x$ at higher temperatures. The NO$_x$ storage and release mechanism of PNAs is thermally controlled, unlike that of LNTs which require a rich purge to release stored NO$_x$.

In WO2015085300, a cold start catalyst is disclosed. The cold start catalyst is effective to adsorb NOx and hydrocarbons (HC) at or below a low temperature and to covert and release the adsorbed NOx and HC at temperatures above the low temperature. The cold start catalyst comprises a molecular sieve catalyst and a supported platinum group metal catalyst. The molecular sieve catalyst consists essentially of a noble metal and a molecular sieve. The supported platinum group metal catalyst comprises one or more platinum group metals and one or more inorganic oxide carriers.

There remains a need for further improvements in technologies to target cold start emissions, in terms of optimum storage and release temperatures and operating window overlap with other catalyst articles used in exhaust gas treatment systems.

SUMMARY OF THE INVENTION

In a first aspect of the invention there is provided a passive NOx adsorber for treating an exhaust gas from a diesel engine, which catalyst article comprises:
  a first washcoat region for adsorbing NOx, wherein the first washcoat region comprises a zeolite catalyst, wherein the zeolite catalyst comprises a noble metal and a zeolite; and
  a substrate having an inlet end and an outlet end;
  wherein the zeolite has a SAR of 2-15.

In a second aspect, the invention further provides an exhaust system for a lean burn engine, such as a diesel engine. The exhaust system comprises a NOx absorber catalyst of the invention and an emissions control device.

In a third aspect, the invention provides a vehicle comprising a lean burn engine and either the NO$_x$ absorber catalyst or the exhaust system of the invention.

In a fourth aspect, the invention provides a method of treating an exhaust gas from a lean burn engine comprising either contacting the exhaust gas with a NO$_x$ absorber catalyst of the invention or passing the exhaust gas through an exhaust system of the invention.

Definitions

The term "region" as used herein refers to an area of washcoat on a substrate. A "region" can, for example, be disposed or supported on a substrate as a "layer" or a "zone". The area or arrangement of a washcoat on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The term "noble metal" as used herein refers to generally refers to a metal selected from the group consisting of ruthenium, rhodium, palladium, silver, osmium, iridium, platinum, and gold. In general, the term "noble metal" preferably refers to a metal selected from the group consisting of rhodium, platinum, palladium and gold.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "adsorber" as used herein, particularly in the context of a $NO_x$ adsorber, should not be construed as being limited to the storage or trapping of a chemical entity (e.g. $NO_x$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory metal oxide thereof.

The expression "substantially free of" as used herein with reference to a material means that the material may be present in a minor amount, such as ≤5% by weight, preferably ≤2% by weight, more preferably ≤1% by weight. The expression "substantially free of" embraces the expression "does not comprise".

The term "loading" as used herein refers to a measurement in units of $g/ft^3$ on a metal weight basis.

DETAILED DESCRIPTION OF THE INVENTION

The catalyst of the invention is for use as a passive NOx absorber (PNA) for treating an exhaust gas from a diesel engine, i.e. it has passive NOx adsorber (PNA) activity. The passive $NO_x$ absorber comprises, or may consist essentially of:
a first washcoat region for adsorbing NOx, wherein the first washcoat region comprises a zeolite catalyst, wherein the zeolite catalyst comprises a noble metal and a zeolite; and
a substrate having an inlet end and an outlet end; wherein the zeolite has a SAR of 2-15.

The first washcoat region comprises, or may consist essentially of, a zeolite catalyst. The zeolite catalyst comprises, consists essentially of, or consists of, a noble metal and a zeolite. The zeolite contains the noble metal. The zeolite catalyst can be prepared according to the method described in U.S. Pat. No. 10,112,184 B2.

The noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the noble metal is selected from the group consisting of palladium (Pd), platinum (Pt) and rhodium (Rh). More preferably, the noble metal comprises, consists essentially of or consists of platinum (Pt), palladium (Pd), or a mixture or alloy of platinum and palladium. Particularly preferably, the noble metal is palladium (Pd).

Generally, it is preferred that the noble metal comprises, consists essentially of or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, consists essentially of or consists of, palladium (Pd) and optionally a second metal selected from the group consisting of platinum (Pt) and rhodium (Rh). Even more preferably, the noble metal comprises, consists essentially of or consists of, palladium (Pd) and optionally platinum (Pt). More preferably, the molecular sieve catalyst comprises palladium (Pd) as the only noble metal.

When the noble metal comprises, consists essentially of or consists of, palladium (Pd) and a second metal, then the ratio by mass of palladium (Pd) to the second metal is preferably >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a first molecular sieve and optionally a base metal. The first molecular sieve contains the noble metal and optionally the base metal.

The base metal may be selected from the group consisting of iron (Fe), copper (Cu), cerium (Ce), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron, cerium or copper, particularly preferably cerium.

Alternatively, the molecular sieve catalyst may be substantially free of a base metal, such as a base metal selected from the group consisting of iron (Fe), copper (Cu), cerium (Ce), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

The first zeolite is typically composed of aluminium, and silicon. The zeolite generally has a three-dimensional arrangement (e.g. framework) of $SiO_4$ and $AlO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

The first zeolite contains the noble metal. The noble metal is typically supported on the first zeolite. For example, the noble metal may be loaded onto and supported on the first zeolite, such as by ion-exchange. Thus, the zeolite catalyst may comprise, or consist essentially of, a noble metal and a first zeolite, wherein the first zeolite contains the noble metal and wherein the noble metal is loaded onto and/or supported on the first zeolite by ion exchange. Preferably, the zeolite catalyst comprises from 0.1 to 5% by weight of the noble metal based on the weight of the first zeolite, more preferably from 0.5 to 2.5% by weight, still more preferably from 1 to 2% by weight.

In general, the first zeolite may be a metal-substituted zeolite. The metal of the metal-substituted zeolite may be the noble metal (e.g. the zeolite is a noble metal substituted zeolite). Thus, the first molecular sieve containing the noble metal may be a noble metal substituted zeolite. When the zeolite catalyst comprises a base metal, then the first zeolite may be a noble and base metal-substituted zeolite. For the avoidance of doubt, the term "metal-substituted" embraces the term "ion-exchanged". The zeolite catalyst generally has at least 1% by weight (i.e. of the amount of noble metal of the zeolite catalyst) of the noble metal located inside pores of the first zeolite, preferably at least 5% by weight, more preferably at least 10% by weight, such as at least 25% by weight, even more preferably at least 50% by weight.

In some embodiments, the zeolite has a framework structure type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVF, AWO, AWW, BCT, BEA, BEC, BIK, BOF, BOG, BOZ, BPH, BRE, BSV, CAN, CAS, CDO, CFI, CGF, CGS, CHA, CHI, CFO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof. In some embodiments, zeolite has a framework structure type selected from the group consisting of AEI, BEA, CHA, FER, MFI, and FAU. In some embodiments, the zeolite is selected from the group consisting of beta zeolite, chabazite, ferrierite, mordenite, ZSM-5, and zeolite Y. In some embodiments, the zeolite is ferrierite.

The first zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms). More preferably, the first zeolite is selected from a small pore zeolite and a medium pore zeolite.

In a first zeolite catalyst embodiment, the first zeolite is a small pore zeolite having a maximum ring size of eight tetrahedral atoms.

The small pore zeolite may have a Framework Type selected from the group consisting of ABW, ACO, AEI, AEN, AFN, AFT, AFV, AFX, ANA, APC, APD, ATN, ATT, ATV, AVL, AWO, AWW, BCT, BIK, BRE, CAS, CDO, CHA, DDR, DFT, EAB, EDI, EEI, EPI, ERI, ESV, ETL, GIS, GOO, IFY, IHW, IRN, ITE, ITW, JBW, JNT, JOZ, JSN, JSW, KFI, LEV, -LIT, LTA, LTJ, LTN, MER, MON, MTF, MWF, NPT, NSI, OWE, PAU, PHI, RHO, RTH, RWR, SAS, SAT, SAV, SBN, SFW, SIV, THO, TSC, UEI, UFI, VNI, YUG or ZON.

The small pore zeolite preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, KFI, LEV, LTA, MER, MON, NSI, OWE, PAU, PHI, RHO, RTH, SAT, SAV, SFW, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, AEI-SAV, CHA- AFX, ERI-CHA and GME-CHA. More preferably, the small pore molecular sieve has a Framework Type that is, AEI, CHA or an AEI-CHA intergrowth. Even more preferably, the small pore molecular sieve has a Framework Type that is AEI, AFX, CHA, LTA or SFW. Even more preferably, the small pore molecular sieve has a Framework Type that is AEI or CHA, particularly AEI.

The zeolite may alternatively be a zeolite having a maximum ring size of nine tetrahedral atoms and having a Framework Type selected from the group consisting of —CHI, LOV, NAB, NAT, RSN, STT or VSV.

In a second zeolite catalyst embodiment, the first zeolite has a Framework Type selected from the group consisting of AEI, MFI, EMT, ERI, MOR, FER, BEA, FAU, CHA, LEV, MWW, CON and EUO, as well as mixtures of any two or more thereof.

In a third zeolite catalyst embodiment, the first zeolite is a medium pore zeolite having a maximum ring size of ten tetrahedral atoms and preferably having a Framework Type selected from the group consisting of FER, MEL, MFI, MTT, MWW, STI or SZR, and more preferably has a Framework Type selected from the group consisting of MFI, FER, MWW EUO. Preferably, the medium pore zeolite has an STI framework, or any mixture or intergrowth thereof.

In a fourth zeolite catalyst embodiment, the first zeolite is a large pore zeolite having a maximum ring size of twelve tetrahedral atoms and having a Framework Type selected from the group consisting of AFI, AFR, AFS, AFY, ASV, ATO, ATS, BEA, BEC, BOG, BPH, CAN, CON, CZP, DFO, EMT, EON, EZT, FAU, GME, GON, IFR, ISV, IWR, IWV, IWW, LTL, MAZ, MEI, MOR, MOZ, MSE, MTW, NPO, OFF, OSI, —RON, RWY, SAO, SBE, SBS, SBT, SFE, SFO, SOS, SSY, USI or VET. The large pore zeolite preferably has a Framework Type selected from the group consisting of CON, BEA, FAU, MOR and EMT, more preferably BEA.

In any one of the first to fourth zeolite catalyst embodiments, it may generally be preferred that the first zeolite (e.g. large pore, medium pore or small pore) has a framework that is not an intergrowth of at least two different Framework Types.

The first zeolite has a silica to alumina molar ratio (SAR) of 2-15. The first zeolite preferably has a SAR of 6-14, more preferably 8-14, still more preferably 8-12, e.g. 8, 9, 10, 11, or 12. A particularly preferred first zeolite has an SAR of about 11.

The zeolite catalyst of the first, third and fourth zeolite catalyst embodiments (and also for some of the Framework Types of the second zeolite catalyst embodiment) may have an infrared spectrum having a characteristic absorption peak in a range of from 750 cm$^{-1}$ to 1050 cm$^{-1}$ (in addition to the absorption peaks for the zeolite itself). Preferably, the characteristic absorption peak is in the range of from 800 cm$^{-1}$ to 1000 cm$^{-1}$, more preferably in the range of from 850 cm$^{-1}$ to 975 cm$^{-1}$.

The zeolite catalyst of the first zeolite catalyst embodiment has been found to have advantageous passive $NO_x$ adsorber (PNA) activity. The zeolite catalyst can be used to store $NO_x$ when exhaust gas temperatures are relatively cool, such as shortly after start-up of a lean burn engine. $NO_x$ storage by the zeolite catalyst occurs at low temperatures (e.g. less than 200° C.). As the lean burn engine warms up, the exhaust gas temperature increases and the temperature of the zeolite catalyst will also increase. The zeolite catalyst will release adsorbed $NO_x$ at these higher temperatures (e.g. 200° C. or above).

It has also been unexpectedly found that the zeolite catalyst, particularly the zeolite catalyst of the second zeolite catalyst embodiment has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the zeolite catalyst is close to or above the effective temperature of the other catalyst components or emissions control devices for oxidising NO and/or HCs.

The passive NOx absorber of the invention may have one of several arrangements that facilitate the storage and release of NOx, and which may provide a broader temperature window for NOx storage and release.

In a first preferred arrangement, the NOx absorber catalyst comprises, consists essentially of, or consists of a first washcoat region, the first washcoat region comprising, consisting essentially of, or consisting of the first zeolite catalyst.

The first washcoat region may be disposed or supported on a substrate. It is preferred that the first washcoat region is directly disposed or directly supported on the substrate (i.e. the first washcoat region is in direct contact with a surface of the substrate).

In the first arrangement, the first washcoat region may be a first zone. The first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the first preferred arrangement described above, the first washcoat region is preferably substantially free of rhodium and/or a $NO_x$ storage component comprising, or consisting essentially of, an oxide, a carbonate or a hydroxide of an alkali metal, an alkaline earth metal and/or a rare earth metal. More preferably, the first washcoat region does not comprise rhodium and/or a NOx storage component comprising, or consisting essentially of, an oxide, a carbonate or a hydroxide of an alkali metal, an alkaline earth metal and/or a rare earth metal. Thus, first washcoat region is preferably not a lean $NO_x$ trap (LNT) region (i.e. a region having lean $NO_x$ trap activity).

The passive NOx adsorber as defined in the first arrangement above may further comprise a second washcoat region for oxidizing nitric oxide (NO), wherein the second washcoat region comprises platinum (Pt) and a support material. Preferably, the support material comprises at least one inorganic oxide selected from the group consisting of alumina, ceria, magnesia, silica, titania, zirconia, niobia, tantalum oxides, molybdenum oxides, tungsten oxides, and mixed oxides or composite oxides thereof. More preferably, the support material comprises at least one inorganic oxide selected from the group consisting of alumina, silica, and mixed oxides or composite oxides thereof. Preferably, the at least one inorganic oxide is not catalytically active in the selective catalytic reduction (SCR) of NOx with a nitrogenous reductant.

The passive NOx absorber as defined in the first arrangement described above may further comprises a diesel oxidation catalyst (DOC) region. The DOC region has diesel oxidation catalyst activity. Thus, the DOC region is able to oxidise carbon monoxide (CO) and/or hydrocarbons (HCs) and optionally nitric oxide (NO).

The DOC region may be a DOC zone. The DOC zone typically has a length of 10 to 90% (e.g. 10 to 45%) of the length of the substrate, preferably 15 to 75% of the length of the substrate (e.g. 15 to 40%), more preferably 20 to 60%

(e.g. 30 to 55% or 25 to 45%) of the length of the substrate, still more preferably 25 to 50% (e.g. 25 to 40%).

The DOC region is preferably disposed upstream of the first washcoat region. It is preferred that the DOC region is disposed at an inlet end of the substrate. More preferably, the DOC region is a DOC zone disposed at an inlet end of the substrate.

Alternatively, the DOC region may be a DOC layer. The DOC layer may extend for an entire length (i.e. substantially an entire length) of the substrate, particularly the entire length of the channels of a substrate monolith.

The DOC layer is preferably disposed on the first washcoat region. Thus, the DOC layer will come into contact with an inlet exhaust gas before the first washcoat region.

The passive NOx absorber of the invention preferably does not comprise a SCR catalyst (e.g. a region comprising a SCR catalyst), particularly a SCR catalyst comprising a metal selected from the group consisting of cerium (Ce), chromium (Cr), cobalt (Co), copper (Cu), iron (Fe), manganese (Mn), molybdenum (Mo), nickel (Ni), tungsten (W), vanadium (V) or a combination of any two or more thereof.

The regions, zones and layers described hereinabove may be prepared using conventional methods for making and applying washcoats onto a substrate are also known in the art (see, for example, our WO 99/47260, WO 2007/077462 and WO 2011/080525).

The first washcoat region of the first arrangement described above typically comprises a total loading of noble metal (i.e. of the noble metal of the zeolite catalyst) of 5 to 550 g ft$^{-3}$, preferably 15 to 400 g ft$^{-3}$ (e.g. 75 to 350 g ft$^{-3}$), more preferably 25 to 300 g ft$^{-3}$ (e.g. 50 to 250 g ft$^{-3}$), still more preferably 30 to 150 g ft$^{-3}$.

The passive NO$_x$ absorber of the invention further comprises a substrate having an inlet end and an outlet end.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the NO$_x$ absorber catalyst of the invention comprises an electrical power connection, preferably at least two electrical power connections, more preferably only two electrical power connections. Each electrical power connection may be electrically connected to the electrically heatable substrate and an electrical power source. The NO$_x$ absorber catalyst can be heated by Joule heating, where an electric current through a resistor converts electrical energy into heat energy.

The electrically heatable substrate can be used to release any stored NO$_x$ from the first washcoat region. Thus, when the electrically heatable substrate is switched on, the NO$_x$ absorber catalyst will be heated and the temperature of the molecular sieve catalyst can be brought up to its NO$_x$ release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

Typically, the passive NO$_x$ absorber releases NO$_x$ at a temperature greater than 200° C. Preferably, the passive NO$_x$ absorber releases NO$_x$ at a temperature of 220° C. or above, such as 230° C. or above, 240° C. or above, 250° C. or above, or 260° C. or above.

The passive NO$_x$ absorber typically absorbs or stores NO$_x$ at a temperature of 250° C. or less. Preferably, the NO$_x$ absorber catalyst absorbs or stores NO$_x$ at a temperature of 220° C. or less, such as 200° C. or less, 190° C. or less, 180° C. or less, or 175° C. or less.

The passive NO$_x$ absorber may preferentially absorb or store nitric oxide (NO). Thus, any reference to absorbing, storing or releasing NO$_x$ in this context may refer absorbing, storing or releasing nitric oxide (NO). Preferential absorption or storage of NO will decrease the ratio of $NO:NO_2$ in the exhaust gas.

The invention also provides an exhaust system comprising the passive $NO_x$ absorber and an emissions control device. Examples of an emissions control device include a diesel particulate filter (DPF), a lean $NO_x$ trap (LNT), a lean $NO_x$ catalyst (LNC), a passive NOx adsorber (PNA), a cold start catalyst (dCSC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a lean $NO_x$ trap (LNT), a selective catalytic reduction (SCR) catalyst, a selective catalytic reduction filter (SCRF™) catalyst, and combinations of two or more thereof.

In a preferred exhaust system of the invention, the emissions control device is a LNT. The $NO_x$ release temperature of the $NO_x$ absorber catalyst of the invention may overlap with a $NO_x$ storage temperature of a LNT. The $NO_x$ absorber catalyst of the invention may be used in conjunction with a LNT and a SCR or SCRF™ catalyst (e.g. an exhaust system comprising a PNA+LNT+SCR or SCRF™, in that order) to provide a broad temperature window for the storage and treatment of $NO_x$.

In general, the exhaust system of the invention may further comprise means for introducing hydrocarbon into the exhaust gas.

The means for introducing hydrocarbon into the exhaust gas may comprise, or consist of, a hydrocarbon supply apparatus (e.g. for generating a rich exhaust gas). The hydrocarbon supply apparatus may be electronically coupled to an engine management system, which is configured to inject hydrocarbon into the exhaust gas typically for releasing $NO_x$ (e.g. stored $NO_x$) from a LNT.

The hydrocarbon supply apparatus may be an injector. The hydrocarbon supply apparatus or injector is suitable for injecting fuel into the exhaust gas. The hydrocarbon supply apparatus is typically disposed downstream of the exhaust outlet of the lean burn engine. The hydrocarbon supply apparatus may be upstream or downstream of the passive $NO_x$ absorber of the invention.

Alternatively or in addition to the hydrocarbon supply apparatus, the lean burn engine may comprise an engine management system (e.g. an engine control unit [ECU]). The engine management system may be configured for in-cylinder injection of the hydrocarbon (e.g. fuel) typically for releasing $NO_x$ (e.g. stored $NO_x$) from a LNT.

Generally, the engine management system is coupled to a sensor in the exhaust system, which monitors the status of a LNT. Such a sensor may be disposed downstream of the LNT. The sensor may monitor the $NO_x$ composition of the exhaust gas at the outlet of the LNT.

In general, the hydrocarbon is fuel, such as diesel fuel. When the hydrocarbon is fuel, such as diesel fuel, it is preferred that the fuel comprises ≤50 ppm of sulfur, more preferably ≤15 ppm of sulfur, such as ≤10 ppm of sulfur, and even more preferably ≤5 ppm of sulfur.

The hydrocarbon supply apparatus may be disposed upstream of the passive $NO_x$ absorber of the invention.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the passive $NO_x$ adsorber of the invention and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCR catalyst or the SCRF™ catalyst), such as when the exhaust system further comprises a hydrocarbon supply apparatus, such as an engine management system configured for in-cylinder injection of a hydrocarbon for releasing $NO_x$ (e.g. stored $NO_x$) from a LNT.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu, V and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide or niobium oxide (e.g. $V_2O_3/WO_3/TiO_2$, $WO_x/CeO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

Preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment of the invention, the exhaust system comprises the passive $NO_x$ absorber of the invention and a lean $NO_x$ trap (LNT) [i.e. an LNT on a separate substrate to the $NO_x$ absorber catalyst]. Such an arrangement may be called a PNA/LNT. The passive $NO_x$ absorber is typically followed by (e.g. is upstream of) the lean $NO_x$ trap (LNT). Thus, for example, an outlet of the passive $NO_x$ absorber is connected, preferably directly connected (e.g. without an intervening emissions control device), to an inlet of the lean $NO_x$ trap (LNT). There may be a hydrocarbon supply apparatus between the passive $NO_x$ absorber and the LNT.

A second exhaust system embodiment relates to an exhaust system comprising the passive $NO_x$ absorber of the invention and a selective catalytic reduction (SCR) catalyst. Such an arrangement may be called a PNA/SCR. The passive $NO_x$ absorber is typically followed by (e.g. is upstream of) the selective catalytic reduction (SCR) catalyst. Thus, for example, an outlet of the passive $NO_x$ absorber is connected, preferably directly connected (e.g. without an intervening emissions control device), to an inlet of the SCR catalyst.

A nitrogenous reductant injector may be arranged between the passive $NO_x$ absorber and the selective catalytic reduction (SCR) catalyst. Thus, the passive $NO_x$ absorber may be followed by (e.g. is upstream of) a nitrogenous reductant injector, and the nitrogenous reductant injector may be followed by (e.g. is upstream of) the selective catalytic reduction (SCR) catalyst.

In the second exhaust system embodiment, it may be preferable that the substrate (e.g. of the passive $NO_x$ absorber) is a filtering monolith. It is particularly preferable that the substrate (e.g. of the passive $NO_x$ absorber) is a filtering monolith when the passive $NO_x$ absorber comprises a DOC region.

A third exhaust system embodiment comprises the passive $NO_x$ absorber of the invention and a selective catalytic reduction filter (SCRF™) catalyst. Such an arrangement may be called a PNA/SCRF™. The passive $NO_x$ absorber is typically followed by (e.g. is upstream of) the selective catalytic reduction filter (SCRF™) catalyst. Thus, for example, an outlet of the passive $NO_x$ absorber is connected, preferably directly connected (e.g. without an intervening emissions control device), to an inlet of the selective catalytic reduction filter (SCRF™) catalyst.

A nitrogenous reductant injector may be arranged between the passive $NO_x$ absorber and the selective catalytic reduction filter (SCRF™) catalyst. Thus, the passive $NO_x$ absorber may be followed by (e.g. is upstream of) a nitrogenous reductant injector, and the nitrogenous reductant injector may be followed by (e.g. is upstream of) the selective catalytic reduction filter (SCRF™) catalyst.

A fourth exhaust system embodiment relates to an exhaust system comprising the passive $NO_x$ absorber of the invention, a lean $NO_x$ trap (LNT) and either a selective catalytic reduction (SCR) catalyst or selective catalytic reduction filter (SCRF™) catalyst. These arrangements may be called a PNA/LNT/SCR arrangement or a PNA/LNT/SCRF™ arrangement. The passive $NO_x$ absorber is typically followed by (e.g. is upstream of) the lean $NO_x$ trap (LNT). The lean $NO_x$ trap (LNT) is typically followed by (e.g. is upstream of) either the selective catalytic reduction (SCR) catalyst or the selective catalytic reduction filter (SCRF™) catalyst. There may be a hydrocarbon supply apparatus between the passive $NO_x$ absorber and the LNT.

A nitrogenous reductant injector may be arranged between the lean $NO_x$ trap (LNT) and either the selective catalytic reduction (SCR) catalyst or the selective catalytic reduction filter (SCRF™) catalyst. Thus, the lean $NO_x$ trap (LNT) may be followed by (e.g. is upstream of) a nitrogenous reductant injector, and the nitrogenous reductant injector may be followed by (e.g. is upstream of) the selective catalytic reduction (SCR) catalyst or the selective catalytic reduction filter (SCRF™) catalyst.

A fifth exhaust system embodiment relates to an exhaust system comprising the passive $NO_x$ absorber of the invention, a catalysed soot filter (CSF) and a selective catalytic reduction (SCR) catalyst. Such an arrangement may be called a PNA/CSF/SCR. The passive $NO_x$ absorber is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In each of the second to fifth exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

The exhaust system of the invention (including the first to the fifth exhaust system embodiments) may further comprise means for introducing hydrocarbon (e.g. fuel) into the exhaust gas. When the means for introducing hydrocarbon into the exhaust gas is a hydrocarbon supply apparatus, it is generally preferred that the hydrocarbon supply apparatus is downstream of the passive $NO_x$ absorber of the invention (unless otherwise specified above).

It may be preferable that the exhaust system of the invention does not comprise a lean $NO_x$ trap (LNT), particularly a lean $NO_x$ trap (LNT) upstream of the passive $NO_x$ absorber, such as directly upstream of the $NO_x$ absorber catalyst (e.g. without an intervening emissions control device).

The PNA activity of the passive $NO_x$ absorber of the present invention allows $NO_x$, particularly NO, to be stored at low exhaust temperatures. At higher exhaust gas temperatures, the passive $NO_x$ absorber is able to oxidise NO to $NO_2$. It is therefore advantageous to combine the passive $NO_x$ absorber of the invention with certain types of emissions control devices as part of an exhaust system.

Another aspect of the invention relates to a vehicle or an apparatus. The vehicle or apparatus comprises a lean burn engine. Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the passive NOx absorber as hereinbefore described, or any of the first to fifth exhaust systems as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 150 to 300° C.

In further preferred methods of treating an exhaust gas from an internal combustion engine, the exhaust gas is contacted with one or more further emissions control devices, in addition to the passive $NO_x$ absorber as hereinbefore described. The emissions control device or devices is preferably downstream of the passive $NO_x$ absorber.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the lean $NO_x$ trap catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

EXAMPLES

The invention will now be illustrated by the following non-limiting examples.

Materials

All materials are commercially available and were obtained from known suppliers, unless noted otherwise.

Example 1: Preparation of Passive $NO_x$ Adsorbers (PNAs) of the Invention

Preparation of AEI Zeolites

Unless stated otherwise, AEI zeolites were prepared by the method described in U.S. Pat. No. 10,112,184 B2, which is incorporated by reference herein in its entirety.

AEI Zeolite with SAR 11

17.94 g of sodium hydroxide pellets (98 wt %) were dissolved in 224.7 g of demineralized water. To the resulting solution and under agitation, 65.5 g USY powder, 33.4 g of N,N-Dimethyl -3,5-dimethylpiperidinium hydroxide solution and 1462.3 g of sodium silicate solution were sequentially added. The resulting initial synthesis mixture was a smooth slurry with a molar composition of 68SiO$_2$: 1.00Al$_2$O$_3$: 0.80ROH: 21.0Na$_2$O: 580H$_2$O (ROH=N,N-Dimethyl-3,5-dimethylpiperidinium).

The initial gel mixture was sealed in a 2000 mL stainless steel agitated autoclave and heated at 120° C. for 73 hours of crystallization. The solid product was recovered by vacuum filtration, the obtained solid phase was washed with demineralized water, and dried overnight in an conventional oven at 120° C. Based on powder X-ray diffraction and fluorescent X-ray analysis, the resulting product was a highly crystallized pure AEI-type zeolite with a SiO$_2$/Al$_2$O$_3$ molar ratio of 11.

AEI Zeolite with SAR 16

The initial synthesis gel was prepared in the same way as for the SAR 11 example above, and has a composition of 68SiO$_2$: 1.00Al$_2$O$_3$: 4.00ROH; 16.25Na$_2$O: 580H$_2$O (ROH=N,N-Dimethyl-3,5-dimethylpiperidinium). The crystallization was carried out at 160° C. for 23 hours of crystallization. The resulting product was a highly crystallized pure AEI-type zeolite with a SiO$_2$/Al$_2$O$_3$ molar ratio of 16.

PNA 1A: 2% Pd/AEI SAR20

Palladium is added to a commercially available AEI zeolite with a silica-to-alumina ratio (SAR) of 20 according to the following procedure to produce PNA 1A: The powder catalyst is prepared by wet impregnation of the zeolite using a soluble palladium compound as the precursor. After drying at 105° C., the sample is calcined at 500° C. to provide the fresh catalyst. The Pd loading of PNA 1A is 2 wt. %.

PNA 1B: 3% Pd/AEI SAR20

PNA 1B is produced using the same procedure as PNA 1A with the exception that the Pd loading of PNA 1B is 3 wt. %.

PNA 1C: 4% Pd/AEI SAR20

PNA 1C is produced using the same procedure as PNA 1A with the exception that the Pd loading of PNA 1C is 4 wt. %.

PNA 2A: 2% Pd/AEI SAR16

PNA 2A is produced using the same procedure as PNA 1A with the exception that the AEI zeolite used had a silica-to-alumina ratio (SAR) of 16 and was prepared as described above. The Pd loading of PNA 2A is 2 wt. %.

PNA 2B: 3% Pd/AEI SAR16

PNA 2B is produced using the same procedure as PNA 2A with the exception that the Pd loading of PNA 2B is 3 wt. %.

PNA 2C: 4% Pd/AEI SAR16

PNA 2C is produced using the same procedure as PNA 2A with the exception that the Pd loading of PNA 2C is 4 wt. %.

PNA 3A: 2% Pd/AEI SAR11

PNA 3A is produced using the same procedure as PNA 1A with the exception that the AEI zeolite used had a silica-to-alumina ratio (SAR) of 11 and was prepared as described above. The Pd loading of PNA 3A is 2 wt. %.

PNA 3B: 3% Pd/AEI SAR11

PNA 3B is produced using the same procedure as PNA 2A with the exception that the Pd loading of PNA 3B is 3 wt. %.

PNA 3C: 4% Pd/AEI SAR11

PNA 3C is produced using the same procedure as PNA 3A with the exception that the Pd loading of PNA 3C is 4 wt. %.

Example 2: NO$_x$ Storage Capacity Test Procedure

The catalyst (0.4 g) is held at the adsorption temperature of about 100° C. for 5 minutes in an NO-containing gas mixture flowing at 2 litres per minute at a MHSV of 300 L*hr$^{-1}$*g$^{-1}$. This adsorption stage is followed by Temperature Programmed Desorption (TPD) at a ramping rate of 17° C./minute in the presence of the same NO-containing gas until the bed temperature reaches about 450° C.

The NO-containing gas mixture during both the adsorption and desorption comprises 10 vol. % O$_2$, 60 ppm NO, 5 vol. % CO$_2$, 1500 ppm CO, 130 ppm C$_3$H$_6$, and 5 vol. % H$_2$O in N$_2$. The NO$_x$ storage is calculated as the amount of NO stored in milligrams per gram of powder catalyst (until the outlet NOx concentration reaches the original inlet value). The results are shown in Table 1.

TABLE 1

| Sample | NOx storage (mgNO/g) |
|---|---|
| PNA 1A | 3.50 |
| PNA 1B | 3.97 |
| PNA 1C | 4.20 |
| PNA 2A | 3.43 |
| PNA 2B | 3.92 |
| PNA 2C | 4.44 |
| PNA 3A | 5.19 |
| PNA 3B | 5.59 |
| PNA 3C | 5.98 |

It can be seen from the results in Table 1 that each of PNAs 3A, 3B, and 3C, which contain a zeolite having an SAR of 11, have increased NOx storage capacity compared to PNAs 1A -1C and 2A-2C. It has surprisingly been found that lower SAR zeolites have this advantageously efficient NOx storage capacity, and that from comparison of, for example, PNA 1B and PNA 2B (SAR of 20 and 16, respectively, at 3 wt % Pd loading) that this is not a purely linear effect with a decrease in SAR. This effect is particularly pronounced at lower Pd loadings, which is advantageous in making more efficient use of the expensive noble metal catalytic component, as acceptable or even improved NOx storage capacity can be obtained while using a relatively low amount of noble metal.

The invention claimed is:

1. A passive NOx adsorber for treating an exhaust gas from a diesel engine, which catalyst article comprises:
   a first washcoat region for adsorbing NOx, wherein the first washcoat region comprises a zeolite catalyst, wherein the zeolite catalyst comprises a noble metal and a zeolite;
   a second washcoat region for oxidising nitric oxide (NO), wherein the second washcoat region comprises platinum (Pt) and a support material; and
   a substrate having an inlet end and an outlet end;
   wherein the zeolite has a SAR of 2-15.

2. The passive NOx adsorber of claim 1, wherein the zeolite has a SAR of 8-14.

3. The passive NOx adsorber of claim 1, wherein the zeolite has a SAR of about 11.

4. The passive NO$_x$ adsorber according to claim 1, wherein the noble metal comprises platinum, palladium, or a mixture or alloy of platinum and palladium.

5. The passive NOx adsorber according to claim 1, wherein the noble metal consists essentially of palladium.

6. The passive NO$_x$ adsorber according to claim 1, wherein the zeolite is selected from a small pore zeolite, a medium pore zeolite and a large pore zeolite.

7. The passive NOx adsorber according to claim 6, wherein the zeolite is a medium pore zeolite having an STI framework, or any mixture or intergrowth thereof.

8. The passive $NO_x$ adsorber according to claim 1, wherein the zeolite is a small pore zeolite having a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, KFI, LEV, LTA, MER, MON, NSI, OWE, PAU, PHI, RHO, RTH, SAT, SAV, SFW, SIV, THO, TSC, UEI, UFI, VNI, YUG, ZON and a mixture or intergrowth of any two or more thereof.

9. The passive $NO_x$ adsorber according to claim 8, wherein the small pore molecular sieve has a Framework Type that is AEI, AFX, CHA, LTA or SFW.

10. The passive $NO_x$ adsorber according to claim 1, wherein the support material comprises at least one inorganic oxide selected from the group consisting of alumina, ceria, magnesia, silica, titania, zirconia, niobia, tantalum oxides, molybdenum oxides, tungsten oxides, and mixed oxides or composite oxides thereof.

11. The passive $NO_x$ adsorber according to claim 1, wherein the support material comprises at least one inorganic oxide selected from the group consisting of alumina, silica, and mixed oxides or composite oxides thereof.

12. The passive $NO_x$ adsorber according to claim 1, wherein the at least one inorganic oxide is not catalytically active in the selective catalytic reduction (SCR) of $NO_x$ with a nitrogenous reductant.

13. The passive $NO_x$ adsorber according to claim 1, further comprising a diesel oxidation catalyst (DOC) region.

14. The passive $NO_x$ adsorber according to claim 1, wherein the substrate is a flow-through monolith or a filtering monolith.

15. An exhaust system comprising the passive $NO_x$ adsorber as defined in claim 1 and an emissions control device.

16. An exhaust system according to claim 15, wherein the emissions control device is selected from the group consisting of emissions control device selected from the group consisting of a diesel particulate filter (DPF), a lean $NO_x$ trap (LNT), a lean $NO_x$ catalyst (LNC), a passive NOx adsorber (PNA), a cold start catalyst (dCSC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof.

17. A vehicle comprising a lean burn engine and a passive $NO_x$ adsorber as defined in claim 1 or an exhaust system as defined in claim 15.

18. A vehicle according to claim 17, wherein the lean burn engine is configured to run on diesel fuel comprising ≤50 ppm of sulfur.

19. A method of treating an exhaust gas from a lean burn engine comprising contacting the exhaust gas with a passive $NO_x$ adsorber according to claim 1 or passing the exhaust gas through an exhaust system according to claim 15.

* * * * *